(12) United States Patent
Pretty

(10) Patent No.: US 11,731,774 B2
(45) Date of Patent: Aug. 22, 2023

(54) DUAL AXIS HINGE RADIAL DISPLACEMENT LIMITER

(71) Applicant: ROHR, INC., Chula Vista, CA (US)

(72) Inventor: Sean Pretty, Jamul, CA (US)

(73) Assignee: ROHR, INC., Chula Vista, CA (US)

(*) Notice: Subject to any disclaimer, the term of this patent is extended or adjusted under 35 U.S.C. 154(b) by 495 days.

(21) Appl. No.: 16/735,110

(22) Filed: Jan. 6, 2020

(65) Prior Publication Data

US 2021/0206500 A1 Jul. 8, 2021

(51) Int. Cl.
*B64D 29/06* (2006.01)
*E05D 3/12* (2006.01)

(52) U.S. Cl.
CPC ............. *B64D 29/06* (2013.01); *E05D 3/125* (2013.01); *E05Y 2900/502* (2013.01)

(58) Field of Classification Search
CPC ........... B64D 29/06; B64D 29/08; F02K 1/60; F02K 1/605; F02K 1/70; F02K 1/72; F02K 1/80
See application file for complete search history.

(56) References Cited

U.S. PATENT DOCUMENTS

| | | | | |
|---|---|---|---|---|
| 5,203,525 A | * | 4/1993 | Remlaoui | E05D 3/06 244/129.4 |
| 5,864,922 A | * | 2/1999 | Kraft | B64D 29/06 16/239 |
| 6,189,832 B1 | * | 2/2001 | Jackson | B64C 7/02 244/129.4 |
| 8,464,541 B2 | | 6/2013 | Andre | |
| 10,247,137 B2 | | 4/2019 | Stuart | |
| 2018/0216379 A1 | | 8/2018 | Spoelstra et al. | |

FOREIGN PATENT DOCUMENTS

| | | |
|---|---|---|
| EP | 3539879 | 9/2019 |
| EP | 3539879 | 4/2020 |
| WO | 9511361 | 4/1995 |

OTHER PUBLICATIONS

European Patent Office, European Search Report dated May 10, 2021 in Application No. 21150276.0.
European Patent Office, European Office Action dated Nov. 9, 2022 in Application No. 21150276.0.

* cited by examiner

*Primary Examiner* — Andrew H Nguyen
(74) *Attorney, Agent, or Firm* — Isnell & Wilmer L.L.P.

(57) ABSTRACT

A dual axis hinge configured for pivotally securing a cowl to a fixed structure of an aircraft is disclosed. In various embodiments, the dual axis hinge includes a link having a first end and a second end; a first pin configured to pivotally secure the first end of the link to the fixed structure and a second pin configured to pivotally secure the second end of the link to the cowl; and a first hinge stop configured for connection to the cowl and a second hinge stop configured for connection to the link.

12 Claims, 4 Drawing Sheets

DUAL AXIS HINGE RADIAL DISPLACEMENT LIMITER

FIELD

The present disclosure relates generally to turbofan propulsion systems for aircraft and, more particularly, to radial displacement limiting hinge systems for a cowl in a nacelle for a turbofan propulsion system.

BACKGROUND

Modern aircraft may utilize one or more turbofan propulsion systems powered by a gas turbine engine. The propulsion systems may include a nacelle, which is a system of components that house the engine and its ancillary systems, and help form aerodynamic surfaces for flight, including a fan bypass air duct. Often, the nacelle includes a cowl or a pair of cowls. The cowl is typically hinged to a fix structure, such as, for example, a pylon, and facilitates access to the engine and the ancillary systems when opened. The cowl also defines an annular shaped compartment that surrounds an inner fixed structure and in which several ducts carrying high pressure fluids or gases reside. During various operating conditions, such as after a burst duct, pressure in the compartment may become abnormally high and, as a result, place a radially outward load against the cowl. The radially outward load against the cowl may result in a radial deflection of the cowl, particularly at a junction between the cowl and an air inlet structure of the nacelle just forward of the cowl. The resulting misalignment of the cowl and the air inlet structure may lead to a phenomena known as scooping, where the high speed ambient air outside the nacelle enters the compartment beneath the cowl, thereby pressurizing the internal surface of the cowl. Scooping may adversely affect the aerodynamic shape of the nacelle and, in some instances, result in damage to or even loss of the cowl from the nacelle.

SUMMARY

A dual axis hinge configured for pivotally securing a cowl to a fixed structure of an aircraft is disclosed. In various embodiments, the dual axis hinge includes a link having a first end and a second end; a first pin configured to pivotally secure the first end of the link to the fixed structure and a second pin configured to pivotally secure the second end of the link to the cowl; and a first hinge stop configured for connection to the cowl and a second hinge stop configured for connection to the link.

In various embodiments, the first hinge stop is configured for connection to a cowl flange. In various embodiments, the cowl flange is configured for attachment to an inside surface of the cowl. In various embodiments, the second hinge stop is connected to the second end of the link.

In various embodiments, the first hinge stop includes a first face and the second hinge stop includes a second face configured to abut the first face when the cowl is rotated toward a closed position. In various embodiments, the first face and the second face are configured to separate when the cowl is rotated toward an open position.

In various embodiments, the fixed structure is a pylon. In various embodiments, the first pin is connected to a pylon flange connected to and extending from the pylon. In various embodiments, the first pin is configured for coaxial disposition with a hinge line of the cowl.

A cowl system for a nacelle of an aircraft is disclosed. In various embodiments, the cowl system includes a fixed structure; and a cowl pivotally mounted to the fixed structure via a dual axis hinge, the dual axis hinge including a link having a first end and a second end, a first pin configured to pivotally secure the first end of the link to the fixed structure and a second pin configured to pivotally secure the second end of the link to the cowl, and a first hinge stop connected to the cowl and a second hinge stop connected to the link.

In various embodiments, the first hinge stop is connected to a cowl flange. In various embodiments, the cowl flange is attached to an inside surface of the cowl. In various embodiments, the second hinge stop is connected to the second end of the link.

In various embodiments, the first hinge stop includes a first face and the second hinge stop includes a second face configured to abut the first face when the cowl is rotated toward a closed position. In various embodiments, the first face and the second face are configured to separate when the cowl is rotated toward an open position.

In various embodiments, the fixed structure is a pylon. In various embodiments, the first pin is connected to a pylon flange connected to and extending from the pylon. In various embodiments, the first pin is configured for coaxial disposition with a hinge line of the cowl.

In various embodiments, the cowl system further includes a second hinge, a third hinge and a fourth hinge pivotally mounting the cowl to the fixed structure. In various embodiments, the second hinge includes a clevis and a lug.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
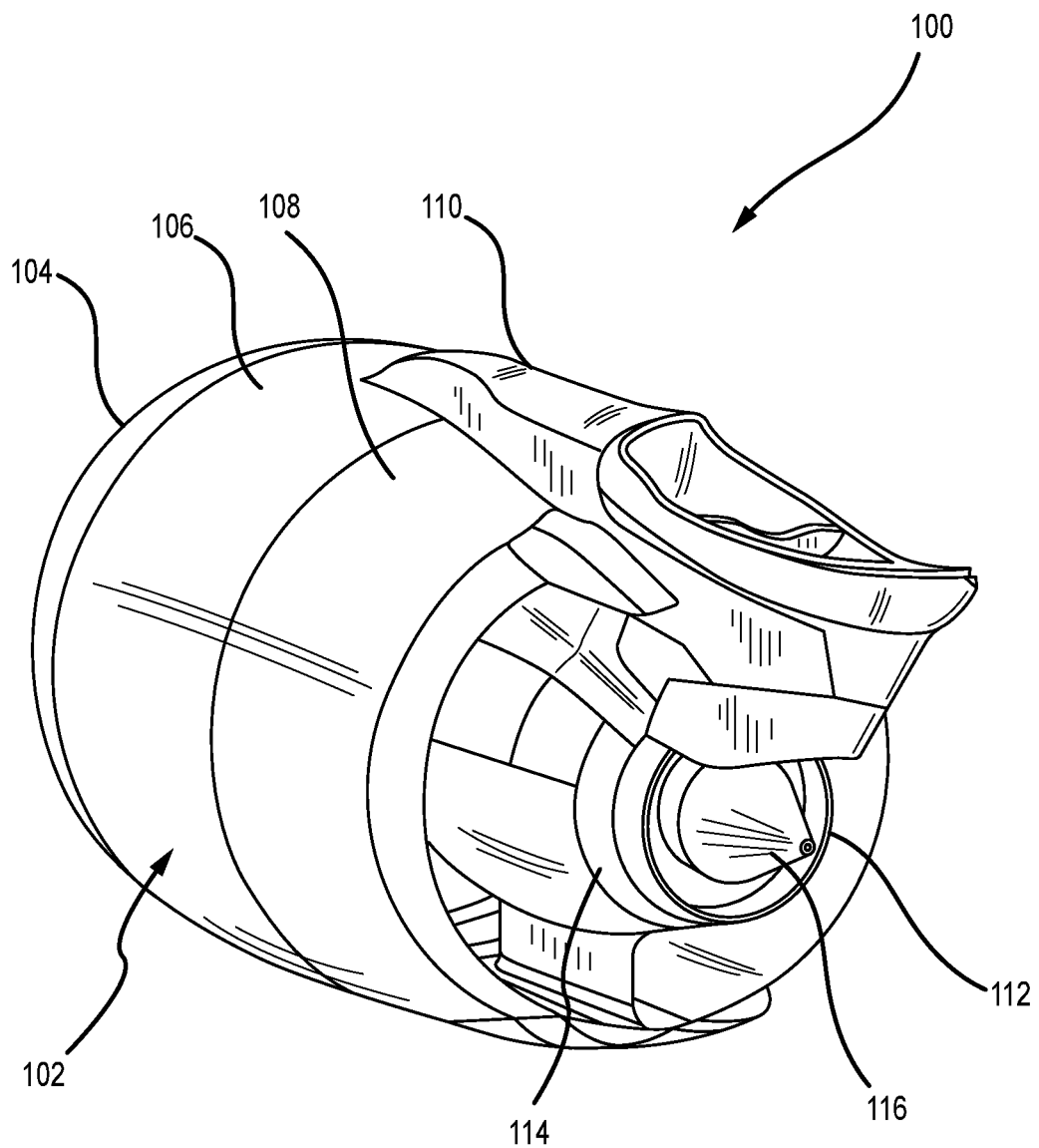
FIG. 1 is a perspective view of a gas turbine engine, in accordance with various embodiments.

Referring to FIG. 1, a gas turbine engine 100 is illustrated according to various embodiments. The gas turbine engine 100 includes a nacelle 102 that surrounds a core engine structure. In various embodiments, the nacelle 102 includes an air inlet 104, a cowl 106 and a thrust reverser 108. The nacelle 102 may be coupled to a pylon 110, which may mount the nacelle 102 and the core engine structure to an aircraft wing or aircraft body. The nacelle 102 may further include an exhaust nozzle assembly including a nozzle 112 and an aft cowl 114 surrounding a center body 116 having a generally conical shape and, in various embodiments, an associated attachment structure. A high-temperature exhaust stream from the core engine structure exits the gas turbine engine 100 between the nozzle 112 and the center body 116.

Figure 2:
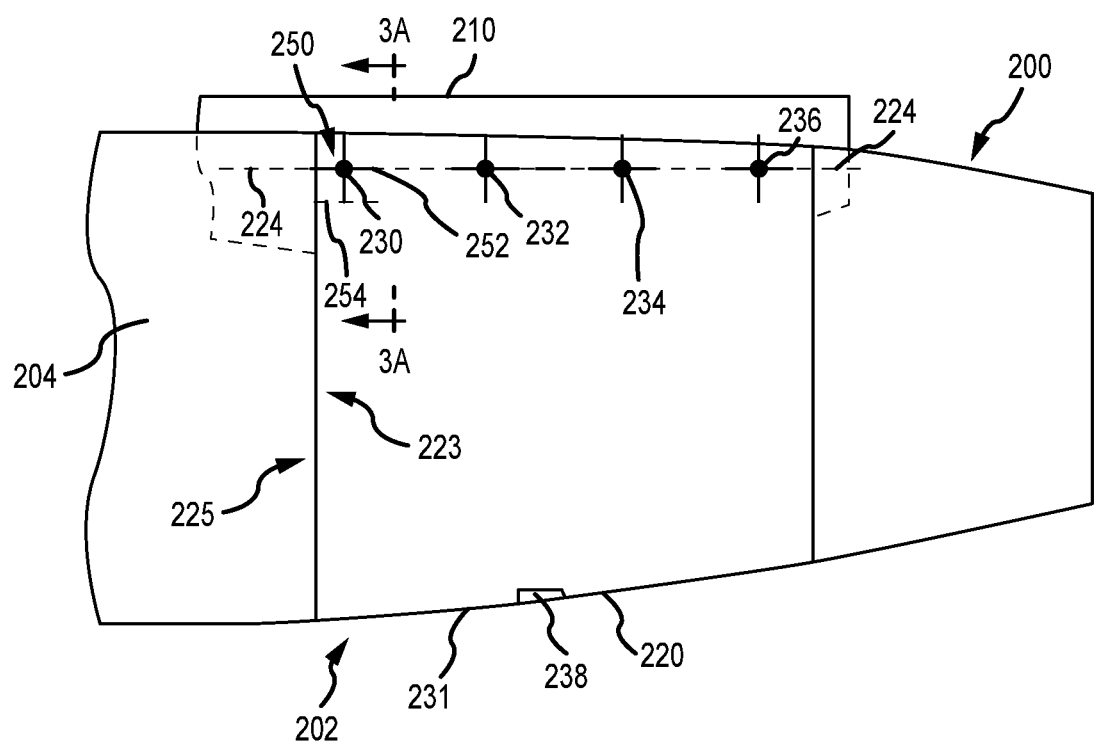
FIG. 2 is a side view of a gas turbine engine having a nacelle and a cowl secured to a fixed structure, in accordance with various embodiments.

Referring now to FIG. 2, there is seen a schematic side view of a gas turbine engine 200 mounted on a pylon 210, which may be secured to an underside of an aircraft wing or to a portion of a fuselage of the aircraft. A nacelle 202 surrounds a core engine structure and various related components of the gas turbine engine 200. A cowl 220 (or a first cowl) is hingedly (e.g., mounted by a hinge) mounted to the pylon 210 in a manner permitting the cowl 220 to be rotated upward and away from the gas turbine engine 200, thereby exposing the core engine structure and various related components to permit access for examination or repair. A second cowl (hidden) is hingedly mounted on the opposite side of the pylon 210. Without loss of generality, in various embodiments, the cowl 220 pivots on four hinge assemblies located just within the cowl 220 and not seen in FIG. 2. The cowl 220 typically pivots about a hinge line 224 defined by the locations of the four hinge assemblies, including a first hinge assembly 230, a second hinge assembly 232, a third hinge assembly 234 and a fourth hinge assembly 236. A cowl lock 238 is positioned at a lower end 231 of the cowl 220 and configured to maintain the cowl 220 in the closed position during operation. One or more of the four hinge assemblies may comprise a conventional clevis and lug coupled together via a pin that extends coaxially with the hinge line 224. At the same time, one or more of the four hinge assemblies, and particularly the first hinge assembly 230, comprise a dual axis hinge 250, which is defined, at least in part, by a first axis 252 that is coaxial with the hinge line 224 and a second axis 254 that is offset from the hinge line 224. As described in more detail below, the dual axis hinge 250 is configured to limit radial displacement of a forward edge 223 of the cowl 220 in a radially outward direction with respect to an aft edge 225 of an air inlet 204 of the nacelle 202 when the cowl 220 assumes a closed position. Limiting radial displacement of the forward edge 223 of the cowl 220 from moving in a radially outward direction, or otherwise limiting or controlling the size of a radial gap caused by such movement, prevents the phenomena known as scooping, as above described.

Figure 3A:
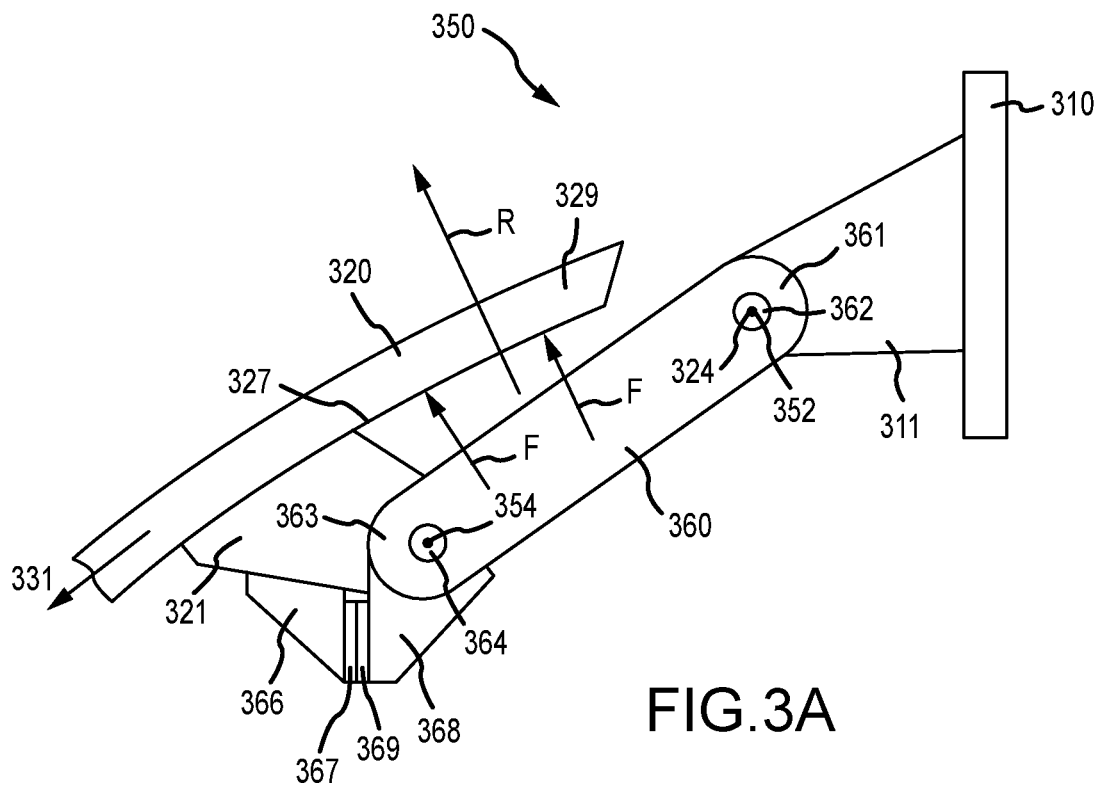
FIGS. 3A and 3B are side views of a dual axis hinge configured to pivotally secure a cowl to a fixed structure, in accordance with various embodiments.
Figure 3B:
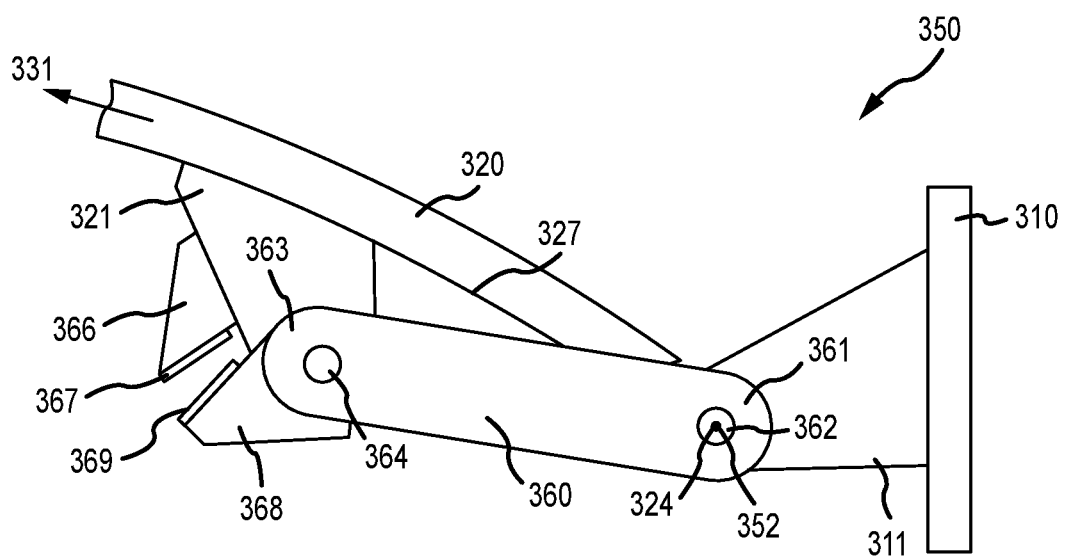

Referring now to FIGS. 3A and 3B, a dual axis hinge 350, similar to the dual axis hinge 250 described above with reference to FIG. 2, is illustrated connected to a cowl 320 in a closed position (see FIG. 3A) and in an open position (see FIG. 3B). In various embodiments, the dual axis hinge 350 includes a link 360 having a first end 361 pivotally secured to a fixed structure, such as, for example, a pylon 310 or a pylon flange 311 connected to and extending from the pylon 310, and a second end 363 pivotally secured to the cowl 320. A first pin 362 is used to secure the first end 361 of the link 360 to the fixed structure, with the first pin 362 extending axially along a first axis 352. In various embodiments, the first axis 352 is coaxial with a hinge line 324 of the cowl 320, similar to the hinge line 224 described above with reference to FIG. 2. A second pin 364 is used to secure the second end 363 of the link 360 to the cowl 320 or to a cowl flange 321 connected to and extending from an inside surface 327 of the cowl 320, with the second pin 364 extending axially along a second axis 354. In various embodiments, the second axis 354 is offset from the first axis 352, as well as the hinge line 324 of the cowl 320, similar to the arrangement described above with reference to FIG. 2.

In various embodiments, a first hinge stop 366 is connected to the inside surface 327 of the cowl 320 via the cowl flange 321 and a second hinge stop 368 is connected to the link 360 proximate the second end 363 of the link 360. The connection of the first hinge stop 366 to the cowl 320 is typically a rigid connection, such that the first hinge stop 366 is prevented from movement with respect to the cowl 320. For example, in various embodiments, the first hinge stop 366 is welded or bolted to the cowl flange 321 or, in various embodiments, the first hinge stop 366 and the cowl flange 321 are constructed as a monolithic or single-piece unit. Similarly, the connection of the second hinge stop 368 to the link 360 is typically a rigid connection, such that the second hinge stop 368 is prevented from movement with respect to the link 360. For example, in various embodiments, the second hinge stop 368 is welded or bolted to the second end 363 of the link 360 or, in various embodiments, the second hinge stop 368 and the link 360 are constructed as a monolithic or single-piece unit. In various embodiments, the first hinge stop 366 includes a first face 367 and the second hinge stop 368 includes a second face 369 configured to abut the first face 367 when the cowl 320 assumes a closed position.

As illustrated in FIG. 3A, when the cowl 320 assumes the closed position, the first hinge stop 366 and the second hinge stop 368 contact one another. More specifically, in various embodiments, when the cowl 320 assumes the closed position, the first face 367 of the first hinge stop 366 and the second face 369 of the second hinge stop 368 abut one another. The manner of contact prevents an upper portion 329 of the cowl 320 from moving or otherwise being displaced in a radial direction R in response to a load or a force F acting in the radial direction R on the inside surface 327 of the cowl 320. In various embodiments, a cowl lock, such as, for example, the cowl lock 238 described above with reference to FIG. 2, will be secured at a lower end 331 of the cowl 320 in order to prevent the dual axis hinge 350 from rotating about the first axis 352 in response to the load or the force F acting in the radial direction R on the inside surface 327 of the cowl 320. Referring now to FIG. 3B, once the cowl lock at the lower end 331 of the cowl 320 is released, the cowl 320 is able to rotate with respect to second end 363 of the link 360 in a direction that enables a space to be created between the first face 367 and the second face 369. Further, the link 360 is able to rotate about the first axis 352, which, as described above, is typically coaxial with the hinge line 324. This enables the various hinges pivotally connecting the cowl 320 to the fixed structure (e.g., to the pylon 310 or to the pylon flange 311) to rotate about the hinge line 324 such that the cowl may assume the open position.

Figure 4:
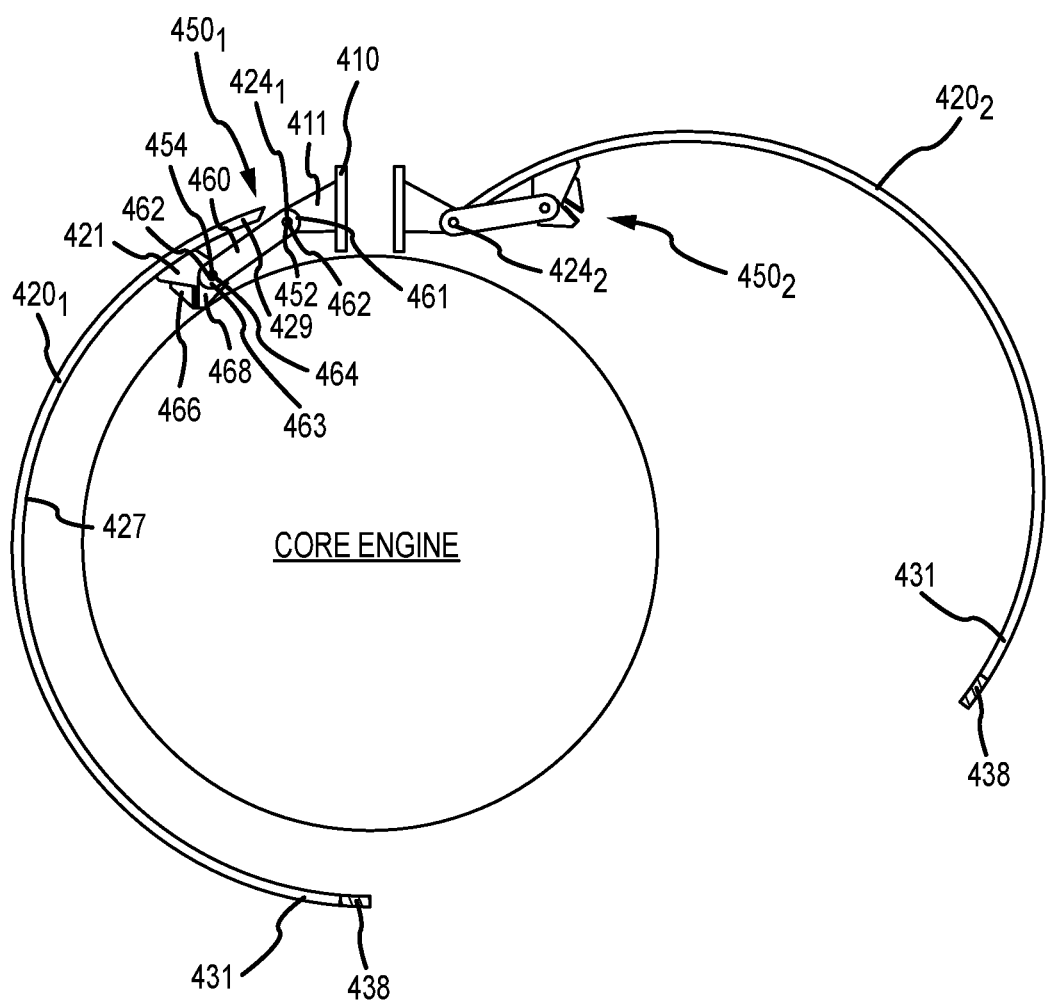
FIG. 4 is an axial view of a cowl system having a dual axis hinge, in accordance with various embodiments.

Referring now to FIG. 4, a cowl system 400 is illustrated. In various embodiments, the cowl system 400 includes a first cowl 4201 and a second cowl 4202 pivotally secured to a fixed structure, such as, for example, a pylon 410 or a pylon flange 411 connected to and extending from the pylon 410. Focusing on the first cowl 4201, a first dual axis hinge 4501 includes a link 460 having a first end 461 pivotally secured to the fixed structure and a second end 463 pivotally secured to the first cowl 4201. A first pin 462 is used to secure the first end 461 of the link 460 to the fixed structure, with the first pin 462 extending axially along a first axis 452, the first axis 452 being coaxial with a first hinge line 4241 of the first cowl 4201, similar to the hinge line 324 described above with reference to FIGS. 3A and 3B. A second pin 464 is used to secure the second end 463 of the link 460 to the first cowl 4201 or to a cowl flange 421 connected to and extending from an inside surface 427 of the first cowl 4201, with the second pin 464 extending axially along a second axis 454. In various embodiments, the second axis 454 is offset from the first axis 452, as well as the first hinge line 4241 of the first cowl 4201, similar to the arrangement described above with reference to FIGS. 2, 3A and 3B.

In various embodiments, a first hinge stop 466 is connected to the inside surface 427 of the first cowl 4201 via the cowl flange 421 and a second hinge stop 468 is connected to the link 460 proximate the second end 463 of the link 460. The connections of the first hinge stop 466 to the first cowl 4201 via the cowl flange 421 and the second hinge stop 468 to the link 460 proximate the second end 463 of the link 460 are similar to those described above with reference to FIGS. 3A and 3B. As illustrated, the second cowl 4202 is pivotally secured to the fixed structure via a second dual axis hinge 4502, which includes each of the components described above with reference to the first dual axis hinge 4501. A cowl lock 438 is used to lock the first cowl 4201 and the second cowl 4202 in place while in the closed position. As described above with reference to FIG. 2, several additional hinges, which may include conventional clevis and lug hinges, may be disposed along both the first hinge line 4241 and the second hinge line 4242 to pivotally mount, respectively, the first cowl 4201 and the second cowl 4202 to the fixed structure (e.g., to the pylon 410).

As illustrated, when the first cowl 4201 assumes the closed position, the first hinge stop 466 and the second hinge stop 468 contact one another. The manner of contact prevents an upper portion 429 of the first cowl 4201 from moving or otherwise being displaced in a radial direction R in response to a load or a force F acting in a radial direction R on the inside surface 427 of the first cowl 4201, in a manner similar to that described above with reference to FIGS. 3A and 3B. In various embodiments, the cowl lock 438 will be secured at a lower end 431 of the first cowl 4201 in order to prevent the first dual axis hinge 4501 from rotating about the first axis 452 or the first hinge line 4241 in response to the load or the force F acting in the radial direction R on the inside surface 427 of the first cowl 4201. Referring to the second cowl 4202, once the cowl lock 438 at the lower end 431 of the second cowl 4202 is released, the second cowl 4202 is able to rotate about the second hinge line 4242. This enables the various hinges pivotally connecting the second cowl 4202 to the fixed structure (e.g., to the pylon 410 or to the pylon flange 411) to rotate about the second hinge line 4242 such that the cowl may assume the open position.

Benefits, other advantages, and solutions to problems have been described herein with regard to specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A dual axis hinge configured for pivotally securing a cowl to a fixed structure of an aircraft, comprising:
a link having a first end and a second end;
a first pin configured to pivotally secure the first end of the link to the fixed structure;
a second pin configured to pivotally secure the second end of the link to a first end of a cowl flange connected to and extending from an inside surface of the cowl via a second end of the cowl flange;
a first hinge stop configured for connection to the cowl flange such that the first hinge stop and the cowl flange are constructed as a monolithic unit;
a second hinge stop configured for connection to the second end of the link such that the second hinge stop and the second end of the link are constructed as a monolithic unit,
wherein the first hinge stop includes a first face and the second hinge stop includes a second face configured to abut the first face when the cowl is in a closed position, and
wherein the manner of contact between the first face and the second face is configured to prevent an upper portion of the cowl from moving or otherwise being displaced in a radial direction (R) with respect to the cowl in response to a load or a force (F) acting in the radial direction on the inside surface of the cowl; and
a cowl lock configured to secure a lower end of the cowl in order to prevent the dual axis hinge from rotating about a first axis in response to the load or the force F acting in the radial direction R on the inside surface of the cowl.

2. The dual axis hinge of claim 1, wherein the first face and the second face are configured to separate when the cowl is rotated toward an open position.

3. The dual axis hinge of claim 1, wherein the fixed structure is a pylon.

4. The dual axis hinge of claim 3, wherein the first pin is connected to a pylon flange connected to and extending from the pylon.

5. The dual axis hinge of claim 4, wherein the first pin is configured for coaxial disposition with a hinge line of the cowl.

6. A cowl system for a nacelle of an aircraft, comprising:
a fixed structure; and
a cowl pivotally mounted to the fixed structure via a dual axis hinge, the dual axis hinge including:
a link having a first end and a second end,
a first pin configured to pivotally secure the first end of the link to the fixed structure,
a second pin configured to pivotally secure the second end of the link to a first end of a cowl flange connected to and extending from an inside surface of the cowl via a second end of the cowl flange,
a first hinge stop connected to the cowl flange such that the first hinge stop and the cowl flange are constructed as a monolithic unit,
a second hinge stop connected to the second end of the link such that the second hinge stop and the second end of the link are constructed as a monolithic,
wherein the first hinge stop includes a first face and the second hinge stop includes a second face configured to abut the first face when the cowl is in a closed position, and
wherein the manner of contact between the first face and the second face is configured to prevent an upper portion of the cowl from moving or otherwise being displaced in a radial direction (R) with respect to the cowl in response to a load or a force (F) acting in the radial direction on the inside surface of the cowl; and
a cowl lock configured to secure a lower end of the cowl in order to prevent the dual axis hinge from rotating about a first axis in response to the load or the force F acting in the radial direction R on the inside surface of the cowl.

7. The cowl system of claim 6, wherein the first face and the second face are configured to separate when the cowl is rotated toward an open position.

8. The cowl system of claim 6, wherein the fixed structure is a pylon.

9. The cowl system of claim 8, wherein the first pin is connected to a pylon flange connected to and extending from the pylon.

10. The cowl system of claim 9, wherein the first pin is configured for coaxial disposition with a hinge line of the cowl.

11. The cowl system of claim 10, further comprising a second hinge, a third hinge and a fourth hinge pivotally mounting the cowl to the fixed structure.

12. The cowl system of claim 11, wherein the second hinge includes a clevis and a lug.

* * * * *

UNITED STATES PATENT AND TRADEMARK OFFICE
CERTIFICATE OF CORRECTION

| | | |
|---|---|---|
| PATENT NO. | : 11,731,774 B2 | Page 1 of 1 |
| APPLICATION NO. | : 16/735110 | |
| DATED | : August 22, 2023 | |
| INVENTOR(S) | : Sean Pretty | |

It is certified that error appears in the above-identified patent and that said Letters Patent is hereby corrected as shown below:

On the Title Page

Item (74) the Attorney, Agent or Firm field: please delete "Isnell" and insert --Snell--

In the Claims

Claim 6, Column 8, Line 17, after the phrase "a monolithic" please insert --unit--

Signed and Sealed this
Twenty-fourth Day of October, 2023

Katherine Kelly Vidal
*Director of the United States Patent and Trademark Office*